United States Patent
Damhofer

(10) Patent No.: US 9,794,490 B2
(45) Date of Patent: Oct. 17, 2017

(54) TIME OF FLIGHT CAMERA SYSTEM WITH A DATA CHANNEL

(71) Applicant: IFM ELECTRONIC GMBH, Essen (DE)

(72) Inventor: Bernd Damhofer, Wolfegg (DE)

(73) Assignee: PMDTECHNOLOGIES AG (DE)

( * ) Notice: Subject to any disclaimer, the term of this patent is extended or adjusted under 35 U.S.C. 154(b) by 302 days.

(21) Appl. No.: 14/399,608

(22) PCT Filed: May 10, 2013

(86) PCT No.: PCT/EP2013/059705
§ 371 (c)(1),
(2) Date: Nov. 7, 2014

(87) PCT Pub. No.: WO2013/178448
PCT Pub. Date: Dec. 5, 2013

(65) Prior Publication Data
US 2015/0116585 A1    Apr. 30, 2015

(30) Foreign Application Priority Data

May 29, 2012   (DE) .................. 10 2012 208 995

(51) Int. Cl.
*G01C 3/08*    (2006.01)
*H04N 5/235*   (2006.01)
(Continued)

(52) U.S. Cl.
CPC .......... *H04N 5/2354* (2013.01); *G01S 7/4811* (2013.01); *G01S 17/89* (2013.01);
(Continued)

(58) Field of Classification Search
CPC .... H04N 5/2354; H04N 5/2253; H04N 5/265; G01S 7/4811; G01S 17/89; H04L 25/4915
See application file for complete search history.

(56) References Cited

U.S. PATENT DOCUMENTS

| 6,587,186 B2 | 7/2003 | Bamji et al. |
| 7,482,837 B2 | 1/2009 | Fagan |
| 2011/0101206 A1 | 5/2011 | Buettgen |

FOREIGN PATENT DOCUMENTS

| DE | 19704496 A1 | 3/1998 |
| DE | 102008030222 A1 | 12/2009 |

(Continued)

OTHER PUBLICATIONS

International Search Report; PCT/EP2013/059705; International Filing Date: May 10, 2013; IFM Electronic GMBH; 2pgs.
(Continued)

*Primary Examiner* — Samantha K Abraham
(74) *Attorney, Agent, or Firm* — Schmeiser, Olsen & Watts, LLP

(57) ABSTRACT

A light speed camera system, with a camera module, which has a light speed photo sensor, preferably based on mixed photo detection, having at least one reception pixel, and with an illumination module which has an illumination light source, wherein the illumination module and the camera module each have a transmission circuit which is formed in such a way that a first signal as a differential signal and a second signal as a modulated basic voltage can be transmitted between the camera module and illumination module via a differential signal line is provided.

4 Claims, 4 Drawing Sheets

Figure 1:
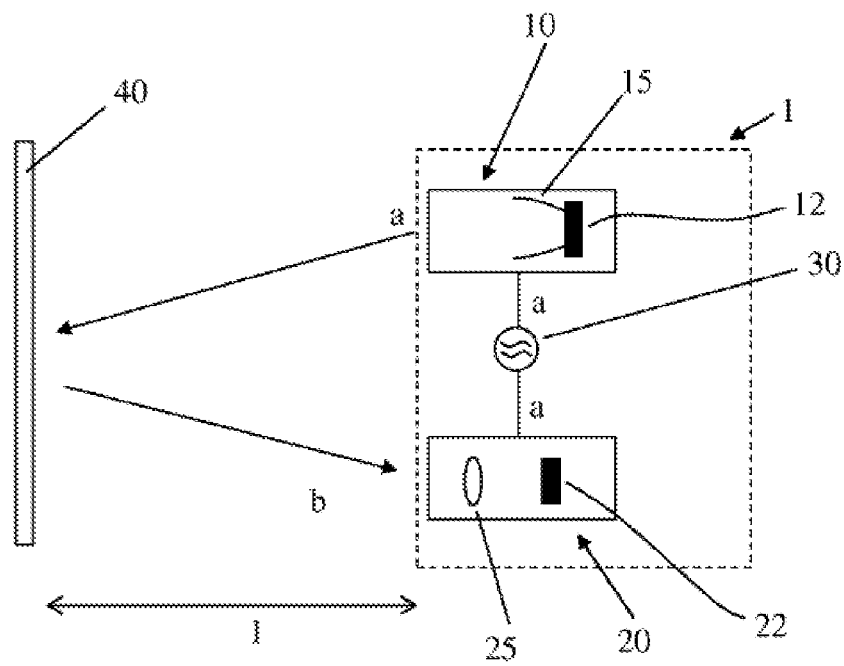

(51) Int. Cl.

| | | |
|---|---|---|
| *G01S 17/89* | (2006.01) | |
| *G01S 7/481* | (2006.01) | |
| *H04N 5/225* | (2006.01) | |
| *H04N 5/265* | (2006.01) | |
| *H04L 25/49* | (2006.01) | |

(52) U.S. Cl.
CPC .......... *H04N 5/2253* (2013.01); *H04N 5/265* (2013.01); *H04L 25/4915* (2013.01)

(56) References Cited

FOREIGN PATENT DOCUMENTS

| DE | 102010043723 A1 | 5/2012 |
|---|---|---|
| DE | 102010063418 A1 | 6/2012 |
| WO | 2012013760 A1 | 2/2012 |

OTHER PUBLICATIONS

H. Schoepp, A. Stiegler, T. May et al. "3D-PMD Camera Systems to Acquire Vehicle Surroundings and to Monitor the Vehicle Interior", 13th International Congress on Electronics in Vehicles, VDI Vehicle and Traffic Technology, Baden-Baden, VDI, 2007.

T. Ringbeck & B. Hagebeuker "A 3D Time of Flight Camera for Object Detection", 8th Conference on Optical 3-D Techniques, ETH Zurich, 2007.

TIME OF FLIGHT CAMERA SYSTEM WITH A DATA CHANNEL

CROSS-REFERENCE TO RELATED APPLICATION

This application claims priority to PCT Application No. PCT/EP2013/059705, having a filing date of May 10, 2013, based on DE 10 2012 208 995.0 filed May 29, 2012, the entire contents of which are hereby incorporated by reference.

FIELD OF TECHNOLOGY

The following relates to a time of flight (TOF) camera system and a procedure to operate such a system.

BACKGROUND

A TOF camera system should not only comprise systems, which directly determine distances from the time of flight but in particular also all TOF or 3D-TOF camera systems which obtain runtime information from the phase shift of an emitted and received radiation. PMD cameras with photonic mixer detectors (PMD), as they are described in the applications EP 1 777 747, U.S. Pat. No. 6,587,186 and DE 197 04 496, among others, are in particular suitable as time of flight or 3D-TOF cameras and are available, for example, from, "ifm electronic gmbh" as Frame-Grabber O3D. The PMD camera in particular permits a flexible arrangement of the light source and of the detector, which can be arranged both in a housing and also separately. Naturally, cameras or devices with at least one reception pixel, like for example the applicant's distance measuring device O1D should also be comprised in the concept of camera and camera system In a TOF camera system in which the illumination and the camera are arranged in separate modules, it is necessary to connect both modules to each other also with respect to a data exchange. In the simplest case, at least the common modulation frequency is to be exchanged via a data line between both modules. In particular, for safety concerns it is of special interest to also exchange safety-related data between the modules, so that, as a rule, several forward and reverse channels must be built between the modules. The data channels can, for example, be constructed as a CAN bus or also as a low voltage differential signal line (LVDS).

The transmission of data via an LVDS line is of special interest, since this transmission is robust against external interferences because of the differential signals. Here, the transmission must not strictly occur at low voltages, namely <5 volts, but it can also be performed at higher voltages. In the case of an LVDS signal transmission, the signal is transmitted via the voltage difference between two signal lines. Since for signal evaluation purposes, only the difference of the voltages on both signal lines is evaluated, the interferences acting equally on both lines have practically no influence on the data signal. Because of the very good interference signal suppression, the differential signal can be reduced, if necessary, to less than 100 mV. This permits, for example, a faster data rate because of the faster rise time.

The use of an LVDS transmission line for a PMD camera system is known, for example, from the publication: T. Ringbeck & B. Hagebeuker "A 3D Time of Flight Camera for Object Detection", 8th Conference on Optical 3-D Measurement Techniques, ETH Zurich, 2007. The publication shows a PMD-3D camera which transmits its modulation signal via an LVDS line to an IR searchlight.

In addition, the following publication also deals with the use of a PMD camera in a vehicle: H. Schoepp, A. Stiegler, T. May et al. "3D-PMD Camera Systems to Acquire Vehicle Surroundings and to Monitor the Vehicle Interior", 13th International Congress on Electronics in Vehicles, VDI Vehicle and Traffic Technology, Baden-Baden, V D I, 2007. The publication shows an IR light source of the PMD system integrated into a radiator grill. The light source is controlled via an LVDS connection, while the modulation signal and also the diagnostic data of the illumination units are fed back to the camera via a LIN bus.

An LVDS system is known from U.S. Pat. No. 7,482,837 B2, in which in addition to the actual data signal a clock signal is also transmitted via the LVDS line. On the transmission side, an LVDS generator and an offset modulator, which acts on the LVDS line, are provided. The potentials are consolidated and transmitted to the receiver via the LVDS line. On the receiver side, the offset voltage is demodulated and a clock signal is determined. As usual, the transmitted data is obtained from the LVDS signal.

A TOF camera system with signal path monitoring is known from WO 2102/013760, in which the illumination and the TOF camera are arranged in separate modules. The signals are preferentially exchanged electrically between both modules, wherein the transmission can occur, for example, via an LVDS signal.

SUMMARY

An aspect relates to the data transmission between the camera and the illumination module.

The aspect is attained by the inventive TOF camera system and the procedure to operate such a system.

A TOF camera system is advantageously provided with a camera module which features a time of flight photo sensor, preferentially on the basis of photonic mixing detection, with at least one reception pixel and with an illumination module which features an illumination source. The illumination module and the camera module respectively feature a transmission circuit, which is configured such that a first signal is transmitted as a differential signal and a second signal as a modulated basic voltage between the camera and the illumination module via a differential signal line.

By means of this procedure an additional data line and thus costs can advantageously be saved.

In another embodiment, a forward and reverse line is provided between the camera and the illumination module which are configured as a potential-free, differential signal lines. It is advantageously provided that the modulation of the basic voltage is configured to a change in the potential differences between the two signal lines.

At least one transmission circuit advantageously features a galvanic separation and, in particular, a transformer, so that the data can be transmitted in a potential-free manner. This has the advantage that predetermined common mode voltages are possible for the modulation of the basic voltage, even outside the common mode.

In another preferred embodiment, the camera and the illumination module are connected with each other via two different channels, wherein the difference channels are designed potential-free and the transmission circuit is configured such that the basic voltage of both difference channels can be modulated, wherein the transmission circuit on the receiver side is configured such that a difference of the basic voltages of both difference channels can be demodulated as a signal.

Also advantageously provided is a procedure to operate a TOF camera system, in which in order to transmit data signals via a difference channel a first signal is provided as a differential signal and another signal by modulating the basic voltage of the difference channel.

The procedure is preferably further developed in that a first and a second differential signal are transmitted via two difference channels, and a third signal is transmitted by modulating the basic voltages of both difference channels.

BRIEF DESCRIPTION

Figure 2:
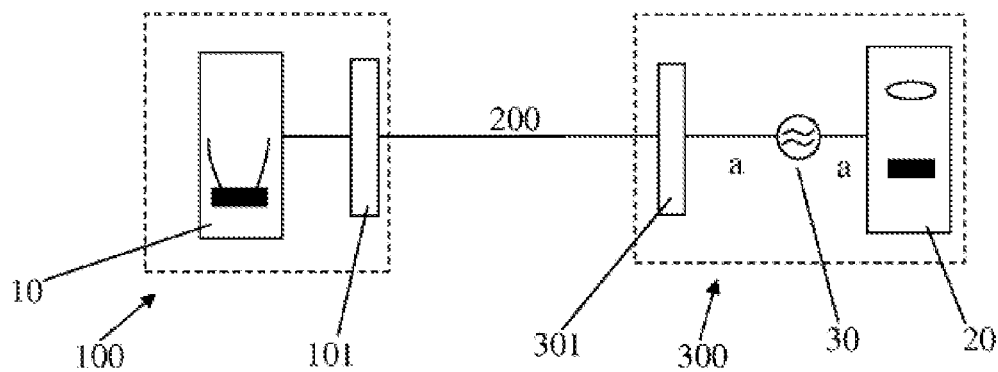
Figure 3:
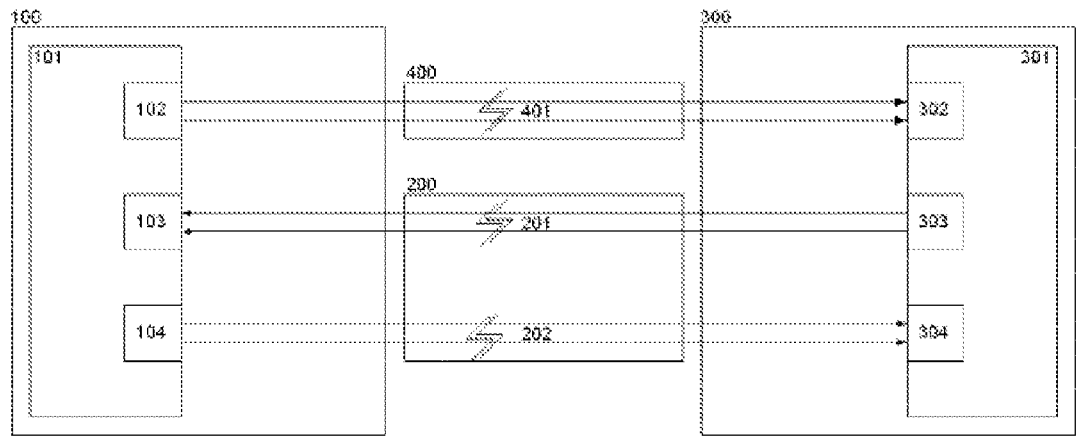
Figure 4:
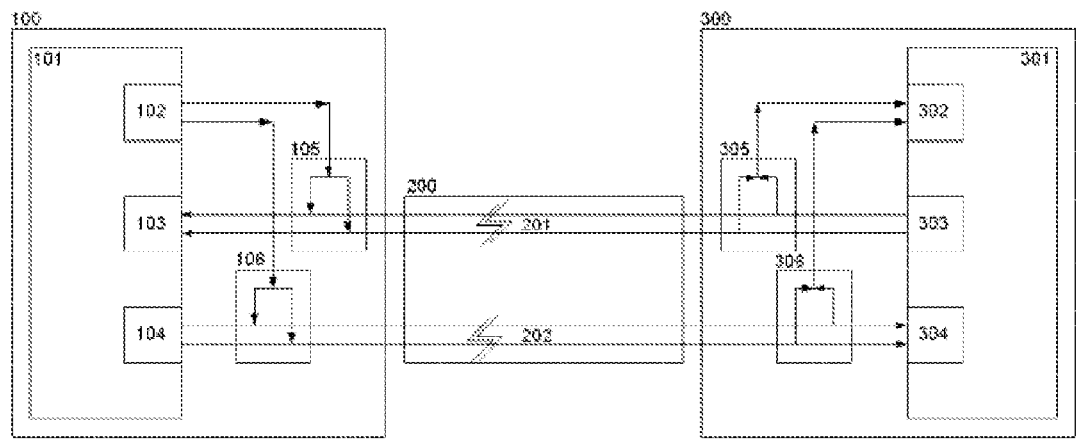
Figure 5:
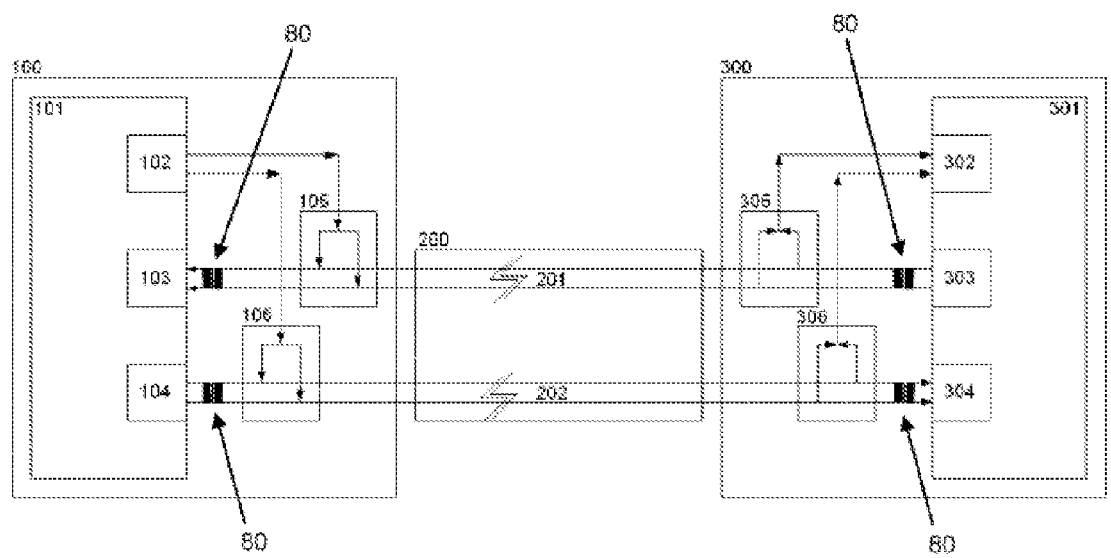
Figure 6:
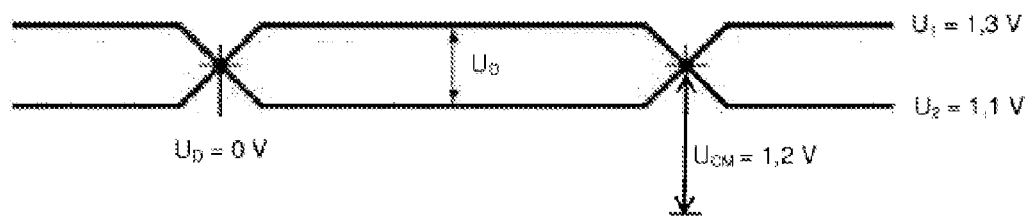
Figure 7:
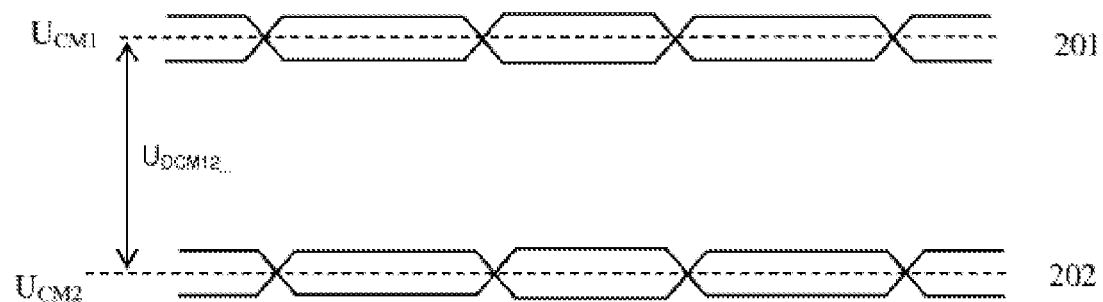
Figure 8:
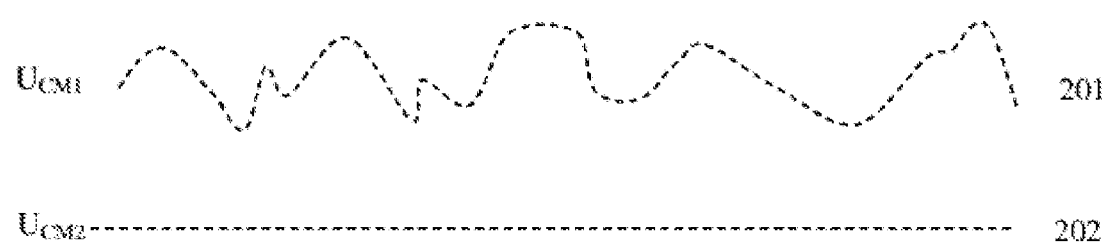

Some of the embodiments will be described in detail, with reference to the following figures, wherein like designations denote like members, wherein:

FIG. 1 the basic principle of a TOF camera according to the PMD principle;

FIG. 2 an inventive TOF camera system;

FIG. 3 data transmission by means of an additional data line;

FIG. 4 an inventive data transmission;

FIG. 5 a potential-free data transmission;

FIG. 6 a schematic diagram of a differential signal;

FIG. 7 a potential difference between two difference channels;

FIG. 8 a modulation between two difference channels; and

Figure 9:
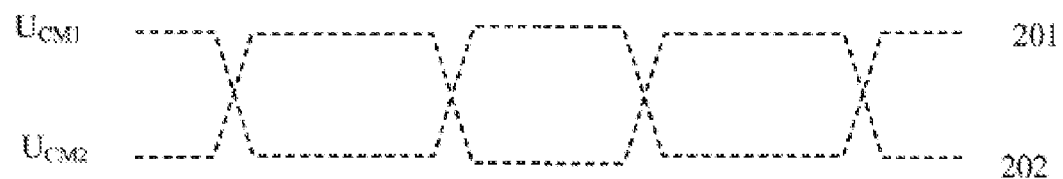

FIG. 9 a differential signal transmission between two difference channels.

DETAILED DESCRIPTION

FIG. 1 shows a measuring situation for an optical distance measurement with a TOF camera, as it is known, for example, from DE 197 04 496.

The TOF camera system 1 comprises a transmission unit and an illumination module 10, 100 with an illumination light source 12 and an associated beam shaping optics 15, as well as a receiver unit or TOF camera 20 with a receiver optics 25 and a TOF photo sensor 22. The TOF photo sensor 22 features at least one pixel, preferentially, however, a pixel array and is configured in particular as a PMD sensor. The receiver optics 25 typically consists of several optical elements to improve the imaging properties. The beam shaping optics 15 of the transmitter unit 10 is preferentially configured as a reflector. Diffractive elements or combinations of reflecting and diffracting elements, however, can be used.

The measuring principle of this arrangement is essentially based on the fact that the runtime of the emitted and reflected light can be determined on the basis of the phase shift of the emitted and received light. For that purpose, the light source 12 and the TOF photo sensor 22 are impinged via a modulator 30 with a specific common modulation frequency with a first phase position a. The light source 12 sends an amplitude-modulated signal with the phase position a corresponding to the modulation frequency. In the shown case, this signal or the electromagnetic radiation is reflected by an object 40 and, as a result of the distance covered, correspondingly strikes in a phase-shifted manner with a second phase position b on the TOF photo sensor 22. In the TOF photo sensor 22, the signal of the first phase position a of the modulator 30 is mixed with the received signal which has the runtime-induced second phase position b, the phase shift or the object distance 1 being determined from the resulting signal.

FIG. 2 shows a TOF camera system in which the transmitting unit 10 and the receiving unit 20 are arranged in separate modules, namely in an illumination module 100 and in a reception or camera module 300. In the shown example, the camera module 300 also features the modulator 30, which transmits its signal via a data transceiver 301 and via a transmission channel 200 to the data transceiver 101 of the illumination module 100, and then to the transmission unit 10. If a response of the illumination module 100 is not provided, the data transceiver 301 of the camera module 300 can also be configured as a simple transmitter, and the data transceiver 101 of the illumination module as a simple receiver.

FIG. 3 shows an exemplary typical connection of the camera module 300 with the illumination module 100 via three data channels 201, 202, 401. The transmission circuit or the data transceiver 301 of the camera module 300 exhibits a first and a second data interface 303, 304 for differential signals and provides a third data interface 302 for additional signals, for example as a CAN bus. The transmission circuit or the data transceiver 101 of the illumination module 100 accordingly correspondingly features first and second data interfaces 103, 104 as well as a third interface 102 for the additional third data channel 401. The first and second difference channel 201, 202 are preferentially bundled via a common cable 200 for the transmission. The modulation for the illumination and camera module 300 are preferentially transmitted via the first difference channel 201 to the illumination module 100. A safety-relevant response, for example according to the ASIL-B standard, can transmit a return signal preferentially originating at the transmitting second data interface 104 via the second difference channel 202 to the second data interface 304 to the camera module 300. To transmit other operationally relevant data, in particular diagnostic data, an additional data line 401, which furthermore is guided via its own cable 400, is required. As a rule, the diagnostic data is not time-critical and can also be transmitted, if necessary, in a simple data protocol.

To avoid additional cabling expenses without having to lose relevant data, a design according to FIG. 4 is recommended. The transmission of the modulation to the illumination module 100 as well as the corresponding response still occurs, as in FIG. 3, via the first and second difference channel 201, 202. The diagnostic data, on the other hand, is not transmitted via a separate cable, but via the already available difference channels 201, 202, by modulating a corresponding data information. In the shown example, it is provided to transmit the diagnostic data from the illumination module 100 in the direction of the camera module 300. To that end, the data is transmitted from the third data interface 102 to the first and second modulation unit 105, 106 for correspondingly modulating the first and second difference channels 201, 202. On the receiver side, the signal is demodulated in the camera module 300 via a first and second demodulator 305, 306 and is provided to the third interface 302 for further processing. Depending on the intended use, this modulation channel can also be configured as a forward and reverse channel or bi-directionally.

The inventive solution now offers different arrangement options. The solution shown in FIG. 4 is essentially characterized by a differential signal modulated onto both data channels between the first and second data channel 201, 202. This additional data flow can be assessed by evaluating the potential differences between both data channels. In another embodiment, the basic potential is evaluated in relation to the reference or ground potential. In a design shown in FIG. 4, this facilitates a data transmission in four data channels.

FIG. 5 shows a preferred embodiment, which, in contrast to the example shown in FIG. 4, provides a galvanic separation 80 before the interfaces 103 and 104 of the illumination module 100. The galvanic separation 80 is, in particular, configured as a transformer, but can also be configured as a capacitive, or optionally also as an optical transmitter, or in general as a transducer. Such a potential-free transmission permits a greater freedom during the modulation of a third signal onto both difference channels 201, 202. For example the modulation can occur in voltage ranges, or at amplitudes which lie outside the allowed "common mode" of the LVDS drivers. Transverse currents between the camera and the illumination modules 300, 100 can in addition also be prevented.

During the transmission of the third signal, the modulation occurs as a signal difference between the first and second difference channel 201, 202. In the simplest case, this can occur as a simple amplitude demodulation, but also other types of modulation can be transmitted. In particular, the third signal can also be transmitted as a differential signal.

The interfaces 102 or 302 can advantageously be configured for modulation or demodulation without a galvanic separation. In order to prevent transverse currents, both or one of both interfaces 102 and 302 can be connected via a resistance or a resistance network with the respective LVDS line or channel 201, 202. Likewise, a connection can also occur via inductances or corresponding networks.

FIG. 6 schematically shows a time profile of an LVDS signal. The differential signal $U_D$ hereby varies around a basic potential and common mode signal $U_{CM}$ of 1.2 volts by +/−100 mV. The high signal thus lies at 1.3 volts and the low signal at 1.1 volt. Since, for the evaluation of the LVDS signal only the difference $U_D$ of both signals is used, it is basically immaterial at what level the basic potential $U_{CM}$ is located. The modulation of the basic potential $U_{CM}$ thus basically leaves the differential signal $U_D$ uninfluenced. What is important is that both line pairs of a difference channel 201, 202 are synchronously allocated with a potential off-set or potential modulation.

FIG. 7 shows a preferred inventive procedure, in which both difference channels 201, 202 are controlled in a potential-free manner according to FIG. 5, wherein on the potential-free segment, the basic potential or the common mode voltage $U_{CM1,2}$ are individually adjustable on each difference channel 201, 202. The information can thus to be transmitted via the modulation of the voltage difference $U_{DCM1,2}$ between both difference channels 201, 202.

FIG. 8 shows a simplified option, according to which the basic potential $U_{CM2}$ of the second difference channel 202 is kept constant, and basically only the first basic potential $U_{CM1}$ is modulated. For the sake of overview, the LVDS profile of both channels 201, 202 is not shown. The transmitted information is to be extracted from the time profile of the voltage difference $U_{DCM1,2}$ between both channels 201, 202. During a transmission of the signal via coils or condensers, a DC-free signal code, for example a Manchester code, is to be preferred.

As already mentioned, the information can be transmitted in various types of modulation, in particular, a transmission as a differential signal, especially as an LVDS is also possible, as shown, for example, in FIG. 9.

LIST OF REFERENCE NUMERALS

1 TOF camera system
10 Transmission unit
12 Illumination source
15 Beam shaping optic
20 Receiver unit, TOF camera
22 TOF photo sensor
25 Receiver optics
80 Galvanic separation
100 Illumination module
101 Data transceiver or transmission circuit of the illumination module
102 Third interface for additional $3^{rd}$ data channel
103 First data interface for differential signals
104 Second data interface for differential signals (optional)
105 First modulation unit onto the $1^{st}$ difference channel
106 Second modulation unit onto the $2^{nd}$ difference channel
200 Transmission channel—cable for modulation
201 First difference channel
202 Second difference channel (optional)
300 Receiver module, camera module
301 Data transceiver or transmission circuit of the receiver module
302 Third interface for additional third data channel
303 First data interface for differential signals
304 Second data interface for differential signals
305 First demodulator for the first difference channel
306 Second demodulator for the second difference channel
400 Transmission channel—cable for diagnostic data
401 Third data channel

The invention claimed is:

1. A time of flight (TOF) camera system, with a camera module which features a TOF photo sensor, on the basis of photonic mixing detection, with at least one reception pixel and with an illumination module which features an illumination light source, wherein:
   the illumination module and the camera module respectively feature a transmission circuit which is configured such that a first signal is transmitted as a differential signal and another signal as a modulated basic voltage between the camera module and the illumination module via at least one difference channel,
   the camera module and the illumination module are connected to each other via two difference channels,
   wherein both transmission circuits only exhibit galvanic separations at interfaces for both difference channels, and the interfaces do not feature a galvanic separation for modulation and demodulation of the modulated basic voltage,
   the transmission circuits are configured such that the basic voltage of both difference channels is modulated, and
   the transmission circuit on a receiver side of the TOF camera system is configured such that a difference of the basic voltages of both difference channels is demodulated as a signal.

2. The TOF camera system according to claim 1, wherein the interfaces for modulation and demodulation are connected via at least one resistance and/or an inductance with the difference channels.

3. A procedure to operate the TOF camera system according to claim 1, wherein the first signal is provided for a transmission of data signals via one of the difference channels as the differential signal, and the another signal by modulation of the basic voltage ($U_{CM1}$, $U_{CM2}$) of the one of the difference channels.

4. The procedure according to claim 3, wherein the first and a second differential signal are transmitted, and the another signal is a third signal that is transmitted by modulated of the basic voltage of both difference channels.

* * * * *